United States Patent [19]
Stapp

[11] Patent Number: 5,930,771
[45] Date of Patent: Jul. 27, 1999

[54] INVENTORY CONTROL AND REMOTE MONITORING APPARATUS AND METHOD FOR COIN-OPERABLE VENDING MACHINES

[76] Inventor: Dennis Stephen Stapp, 115 Spinnaker Cir., Madison, Ala. 35758

[21] Appl. No.: 08/770,482

[22] Filed: Dec. 20, 1996

[51] Int. Cl.[6] ............................................. G06F 153/00
[52] U.S. Cl. .............................. 705/28; 705/14; 705/26
[58] Field of Search ................................. 705/26, 28, 22, 705/14; 364/479.11, 479.01, 479.06; 340/825.35; 379/106.01, 91.01

[56] References Cited

U.S. PATENT DOCUMENTS

| | | | |
|---|---|---|---|
| 4,369,442 | 1/1983 | Werth et al. | 377/7 |
| 4,412,292 | 10/1983 | Sedam et al. | 364/479.11 |
| 4,563,739 | 1/1986 | Gerpheide et al. | 705/28 |
| 4,884,212 | 11/1989 | Stutsman | 364/479.07 |
| 4,907,250 | 3/1990 | Ricks | 377/7 |
| 5,091,713 | 2/1992 | Horne et al. | 340/541 |
| 5,159,560 | 10/1992 | Newell et al. | 364/478.03 |
| 5,207,784 | 5/1993 | Schwartzendruber | 221/6 |
| 5,305,197 | 4/1994 | Axler et al. | 705/14 |
| 5,316,124 | 5/1994 | Barnes et al. | 194/206 |
| 5,400,253 | 3/1995 | O'Connor | 530/423 |
| 5,404,384 | 4/1995 | Colburn et al. | 377/6 |
| 5,491,326 | 2/1996 | Marceau et al. | 235/381 |
| 5,526,401 | 6/1996 | Roach, Jr. et al. | 455/412 |
| 5,619,024 | 4/1997 | Kolls | 235/381 |
| 5,641,050 | 6/1997 | Smith et al. | 194/210 |
| 5,685,435 | 11/1997 | Picioccio et al. | 209/677 |
| 5,696,908 | 12/1997 | Muehlberger et al. | 379/91 |
| 5,769,269 | 6/1998 | Peters | 221/7 |
| 5,794,144 | 8/1998 | Comer et al. | 455/426 |

FOREIGN PATENT DOCUMENTS

4037689 A1  6/1992  Germany.

OTHER PUBLICATIONS

"Imp Introduces First Programmable Ic To Monitor Analog Signals", pp. 1–4; Dialog: File 16, May 20, 1996.
"Application Include Remote Monitoring of Utility Meters and vending Machines", BellSouth, Jan. 4, 1996, Dialog: File 16.

*Primary Examiner*—Allen R. MacDonald
*Assistant Examiner*—Romain Jeanty
*Attorney, Agent, or Firm*—Terrance L. Siemens

[57] ABSTRACT

There is provided an apparatus and method for monitoring inventory in a plurality of coin-operated vending machines. A bar code scanner is used to log inventory into a memory within each vending machine. As merchandise is dispensed, transaction records including the date and time of sale are generated and stored within each vending machine. Denominations of currency tendered by a buyer for each transaction are also stored. At a predetermined time under the control of a processor in cooperation with a real-time calendar-clock within each vending machine, stored information about each vending transaction is transmitted via a cellular telephone interface and modem to a central computer where a statistical analysis of sales for a single vending machine or for predetermined groups of vending machines may be performed. Calls are times such that no two vending machines are attempting to communicate with the central computer at the same time. Consequently, a single cellular telephone number may be used by all vending machines. Inventory status and change remaining in a vending machine may also be communicated to the central computer.

12 Claims, 3 Drawing Sheets

INVENTORY CONTROL AND REMOTE MONITORING APPARATUS AND METHOD FOR COIN-OPERABLE VENDING MACHINES

BACKGROUND OF THE INVENTION

1. Field of the Invention

This invention relates to the field of coin-operable product vending machines, and more particularly, to an apparatus and method for inventory management and remote monitoring of product sales and vending machine status information.

2. Description of the Prior Art

The term "vending machine" was first used in the early 1900s to refer to a coin-operated merchandise dispensing machine. A wide variety of products ranging from foodstuffs such as snacks, hot or cold beverages, and frozen confections to non-edible merchandise like newspapers, magazines, toiletries, cigarettes or stamps may now be found in vending machines. The basic concept is that a vending machine contains an inventory of a particular product or products available to potential buyers on a twenty-four hour per day basis without the need for the presence of a human sales person. Individual units of merchandise are dispensed in response to a purchaser's order and the deposition of the required purchase price in the form of coins, bills, or debit/credit cards. Vending machines may be located in remote areas where the sales volume would not justify a normal attended sales outlet.

In a typical vending machine business, a number of machines are owned or operated by a single person or entity. Machines are grouped into "routes" and a periodically visited by an attendant who replenishes the merchandise in the machine, replenishes coin and/or bill supplies used for making change, removes any out-of-date merchandise no longer fit for sale, checks and adjusts the machine as required and may also remove the collected monies.

Because each individual machine experiences different traffic patterns and the buying preferences of the customers at each machine site may vary, it has been difficult in the past for machine owners and/or route attendants to efficiently service the machines. If a sold-out condition occurs, sales may be lost and customer good will may be jeopardized. If excessive quantities of products having expiration dates must be discarded because of low sales volume, profits from the machines are diminished.

Some of the problems of vending machine inventory management have previously been addressed. U.S. Pat. No. 4,369,442 for Code Controlled Microcomputer Readout From Coin Operated Machine; issued to Robert L. Werth, et al. on Jan. 18, 1983, teaches a system of counters within a vending machine. A portable collection unit (PCU) may be attached to a vending machine by a machine attendant. The PCU interrogates the machine's internal counters and receives various sales and machine status information. The PCU may also serve as a programming unit to input new information such as price changes, etc. into the vending machine. This system suffers in that a route attendant has no forewarning about remaining product inventory in any particular machine and therefor, may be unable to restock adequate quantities of a product which has been selling rapidly. On the other hand, a route attendant may find himself overstocked with other items. This is inefficient and in the case of perishable products, may cause waste and consequent erosion of profits. Because of these uncertainties, attendants may be forced to visit machines frequently to insure an uninterrupted supply products to potential buyers. By contrast, the present invention provides route attendants with accurate inventory information for a machine prior to visiting the machine thus allowing an optimized machine visitation schedule and minimizing both sold out and out-of-date product situations.

Another system for monitoring vending machines is disclosed in U.S. Pat. No. 4,412,292, System For The Remote Monitoring of Vending Machines; issued to Jason K. Sedam, et al. on Oct. 25, 1983. Total sales count and sales dollar volumes are accumulated for each product. A scheduling feature allows a each of a plurality of machines to communicate with a central computer in an orderly fashion via dedicated telephone lines. Abnormal conditions may be called to the central computer in "real time", i.e. as the condition is detected. In contradistinction, the inventory management system of the present invention differs significantly in that total inventory information, i.e. product quantities currently in the machine, not just sold item counts, are kept locally in the vending machine. Sales transactions are individually logged and log information includes the date and time of sale. In the inventive system, each vending machines "knows" immediately about product added or removed by the route attendant. Consequently, at any given moment, accurate up-to-date inventory information, is available. Conversely, in the SEDAM, et al. system, only the central computer contains the inventory status information, and then only after the status is manually entered, possibly many hours after the machine had been serviced, e.g. at the end of a shift. Reconciling physical inventory to the inventory that the central computer assumes is in a particular machine may therefor be difficult.

Another vending machine inventory management system is disclosed in U.S. Pat. No. 5,091,713 for Inventory, Cash, Security, And Maintenance Control Apparatus And Method For a Plurality of Remote Vending Machines issued to Arthur H. Horne, et al. Feb. 25, 1992. Horne, et al. disclose a system for the remote monitoring of a vending machine. Various environmental parameters are monitored and alarm conditions are established when abnormal machine performance is sensed. The vending machine initiates a call over a standard, dedicated telephone line to a central computer informing the computer of the machine status or of the fact that an individual item has been sold. This system has several disadvantages overcome in the instant invention. First, a dedicated telephone line is required for each machine on the route. This in and of itself is expensive. Second, numerous calls are made by the machine through any given period of time. In remote areas, this may require a toll call. Consequently, the ongoing operational expense may be high. Third, the central computer must be available to monitor calls on a continuous basis and there must be a sufficient number of dial-up ports available on the computer to insure that there is not excessive contention by multiple vending machines attempting to dial into the computer at once. All inventory status information must be maintained at the central computer. By contrast, the inventory control system of the present invention differs significantly in that all inventory information is maintained at the vending machine itself where it may easily be reconciled to physical inventory. In addition, only periodic contacts with the central computer need be made, and such contacts are made via cellular telephone technology eliminating the need for the installation and maintenance of multiple, dedicated telephone lines. The central computer need only be available during certain, predetermined time periods to accept calls from the vending machines.

U.S. Pat. No. 5,400,253 for Automated Statistical Inventory Reconciliation System for Convenience Stores and Auto/truck Service Stations; issued to Paul M. O'Connor on Mar. 21, 1995 teaches an automated system that constantly collects data from a tank monitoring system, a fuel system and point-of-sale systems for the purpose of fuel inventory reconciliation. Statistical data analysis is performed locally and the results of the analysis are periodically communicated to a central computer using ordinary telephone lines. System problems identified by the monitoring equipment are also communicated to the central computer. In contrast, the inventive system differs from the O'Connor systems in several significant ways. First, a vending machine usually dispenses discreet units of merchandise unlike a fuel dispensing system. In addition, in the environment of liquid fuel dispensing, a significant safety hazard exists. Consequently, the O'Connor system heavily orientated towards safety issues. The O'Connor system reconciles inventory to detect losses dues to miscalibration of the fuel dispensers and/or tank leakage. In contrast, the inventory management system of the present invention is oriented to providing uninterrupted supplies of good-selling products and minimizing spoilage losses for slow selling products through an analysis of customer preferences and buying trends.

Finally, U.S. Pat. No. 5,404,384 for Inventory Monitoring Apparatus Employing Counter for Adding and Subtracting Objects Being Monitored; issued to Eric R. Colburn, et al. on Apr. 4, 1995 teaches an apparatus suitable for mounting on a wall in a stock room or the like. Items to be monitored are counted by means of a switch actuation as they are added to or removed from a support peg. A microprocessor-based system counts the items as they are added and removed, thereby providing an accurate inventory of the monitored items. In contrast, the system of the present invention logs inventory with price data into the vending machine by scanning bar codes. Items of merchandise removed from inventory through the vending process are automatically counted by the controlling processor. Spoiled merchandise, removed from the vending machine, is also counted using a bar code scanner.

It is, therefor, an object of the present invention to provide an inventory tracking systems resident within a coin-operated vending machine for ease of inventory reconciliation by route restock/service personnel.

It is a further object of the invention to provide an inventory monitoring system with capability for communicating sales transaction, inventory and change supply information periodically to a remote computer.

It is a still further object of the invention to provide communication with a central computer without the need for dedicated telephone lines by using cellular telephone technology.

It is another object of the invention to provide route refill/service employees with an accurate analysis of the sales from individual vending machines so that an optimized mix of products may be made available for refilling the machine.

An additional object of the invention is to provide an inventory management system which tracks the placement of individual items in individual positions or slots within racks so as to allow the placement of mixed inventory in individual racks within a vending machine.

Yet another object of the invention is to track the date and time of sales to allow analyzing purchase patterns and/or trends.

A still further object of the invention is to track the denominations of coins and bills tendered for the purchase of merchandise so as to allow optimizing a change supply for a vending machine.

Another object of the invention is to allow use of a debit card for purchases from a vending machine equipped with the inventory control system of the present invention.

SUMMARY OF THE INVENTION

The inventory management system of the present invention provides a system for monitoring the placement of individual items of merchandise in individual position within the racks of a coin-operated vending machine. Bar codes or similar identifiers affixed to rack and slots within racks are scanned into a memory resident within the vending machine. UPC bar codes from merchandise to be dispensed are also stored. The vending machine is equipped to monitor and record the denomination of all coins and bills or debit card tendered and to time-stamp each sale and store a record of the transaction within the vending machine. At a preprogrammed time, the vending machine initiates a telephone call using a cellular communication interface and transmits via modem the records of sales to a central computer for analysis. The system uses a single cellular number to service a plurality of vending machines and individual machines are programmed to transmit only during a time slot assigned to them. Records of sales may be analyzed and route refill/service employees provided detailed analysis of the preferences and buying patterns of the patrons of each individual machine. Inventory outage and spoilage can be minimized and profitability thereby maximized.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Figure 1:
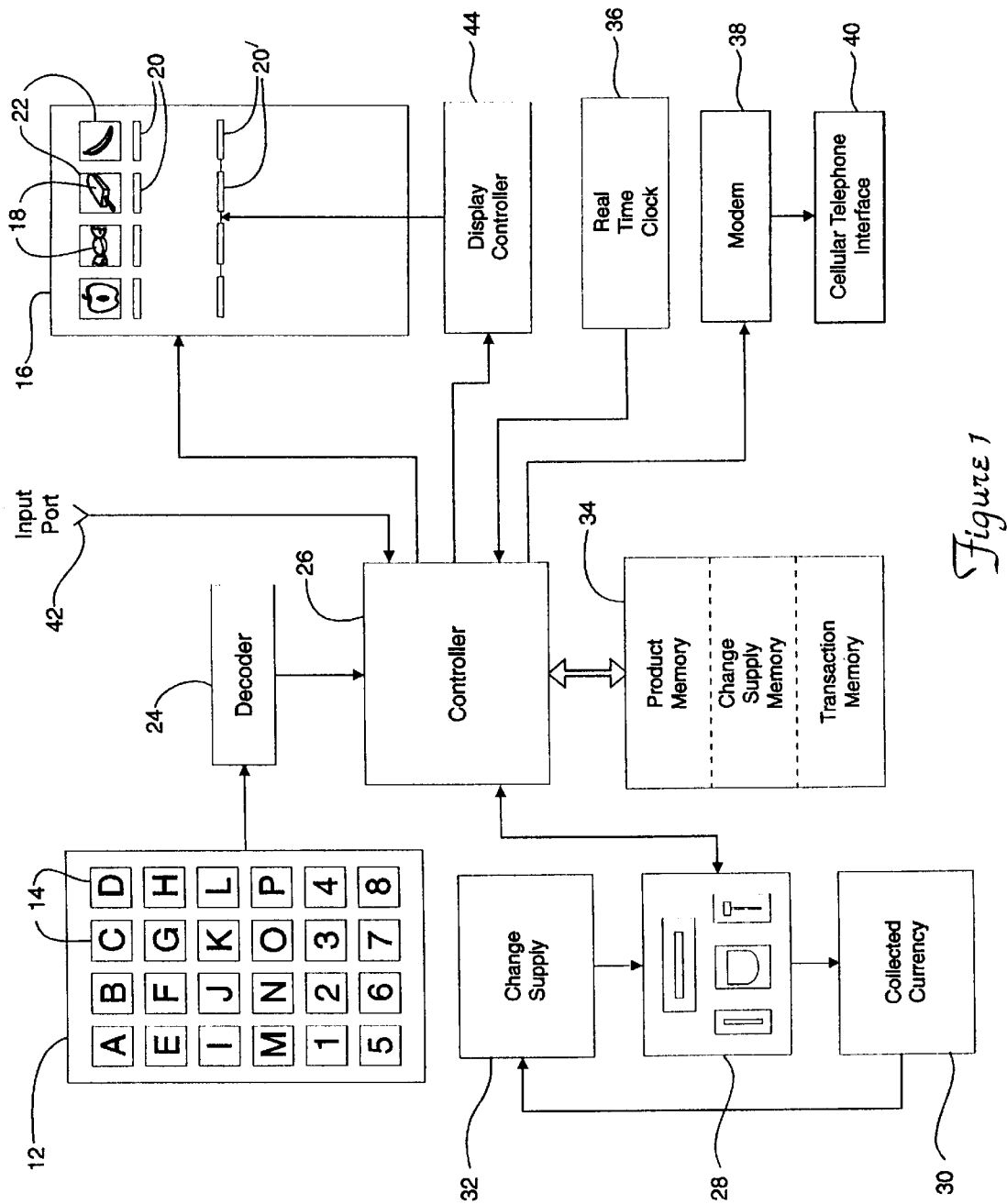
FIG. 1 is a schematic block diagram of a typical vending machine incorporating the inventory management system of the present invention.

Referring first to FIG. 1, there is shown generally at reference number 10, a schematic block diagram of a typical vending machine incorporating the inventory management system of the present invention. A product selection panel 12 contains a plurality of product selection buttons 14. Buttons 14 are used by a buyer (not shown) to select from a variety of products 18 displayed in dispensing unit 16. Products 18 are disposed in uniquely identified racks 22. A machine-readable identification code such as a bar code (not shown) is affixed to each rack 22. Each rack 22 comprises a number of positions (not shown), each position being capable of retaining a single unit of product 18 to be dispensed. Each position within each rack 22 may also be uniquely identified with a machine-readable code such as a bar code (not shown). A label 20, proximate each product 18, displays both a selection code (i.e. button identification) and selling price. Optionally, the label function may be implemented using LED, LCD or similar display technology so that selling price may be dynamically changed. Optional labels 20' are shown connected to display controller 44 which receives input from controller 26 described in detail hereinbelow.

Decoder 24 receives button-press information from selection unit 12 and produces a unique signal representative of the rack 22 containing the desired product 18. A coin/currency and/or debit card acceptance unit 28 is provided to receive the requisite number of bills and/or coins from the buyer to purchase the desired product 18. Acceptance unit 28 tallies the money tendered including an exact count of each coin and bill denomination or debit card amount. Acceptance unit 28 generally incorporates a change-providing mechanism supplied with change from change supply 32. Some vending machines may also accept credit or debit cards using technology well know in the art but which does not form a part of the instant invention. Currency collected by acceptance unit 28 is securely stored in currency collection box 30 and held until removed by a machine refill/service employee. In some vending machines 10, coins from acceptance unit 28 may be recirculated as required into change supply 32. A variety of acceptance mechanisms for performing these functions are well known in the art, typical units suitable for use in practicing the instant invention are models USLZ001 or MKA-2141 manufactured by CONLUX USA.

Figure 3:
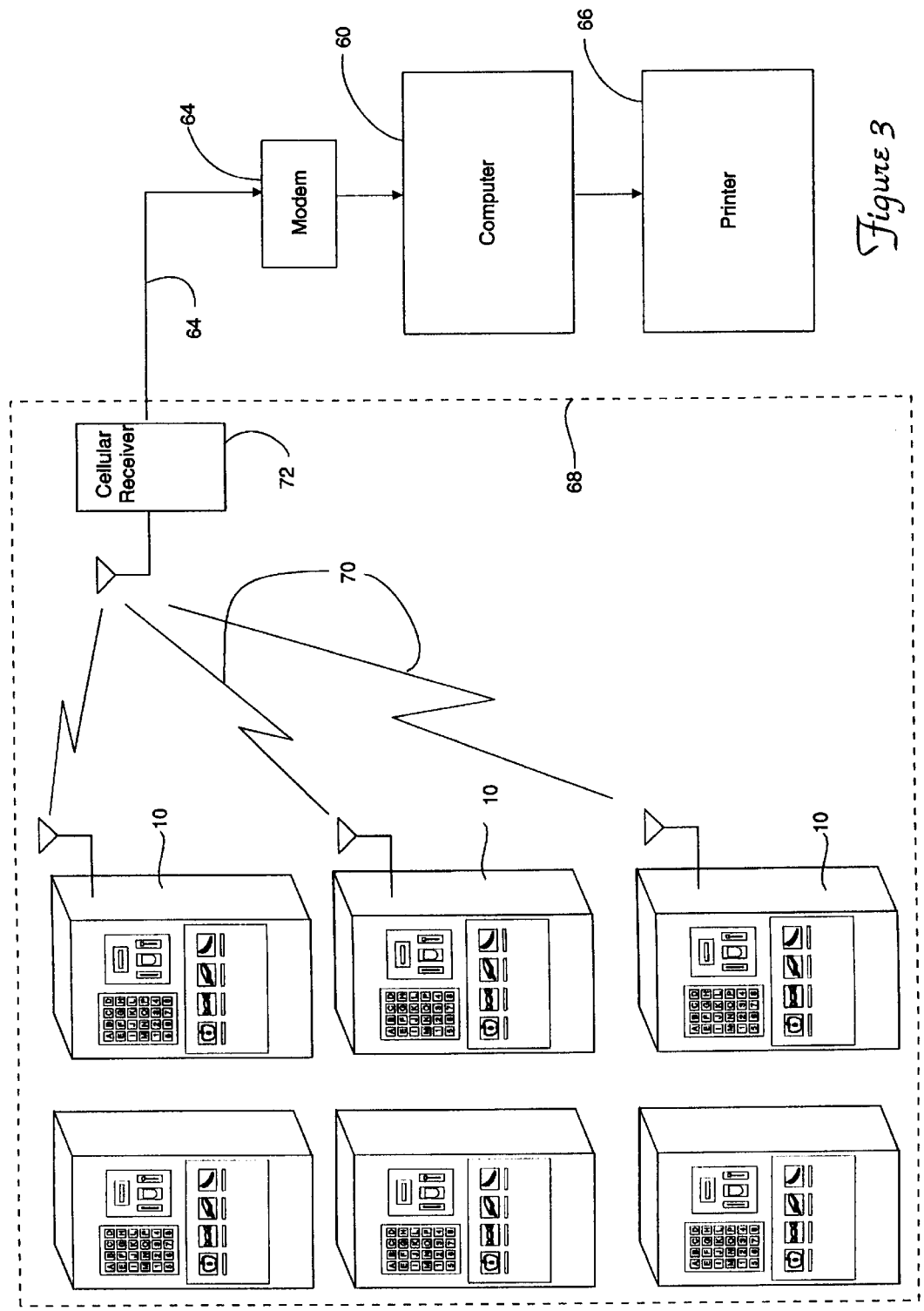
FIG. 3 is a system block diagram showing a plurality of vending machines communicating with a central computer via a cellular telephone link.

A controller 26 is provided to manage the inventory control functions of the instant invention. Controller 26 may be constructed from standard components well know in the art, or may be a commercially available controller such as the CMD11A8 manufactured by AXIOM Manufacturing. Non-volatile memory 34 connected to controller 26 is provided for storing data such as product price, available change, and/or detailed transaction records. Memory 34 may be implemented in any of many ways well known in the art, typically in DRAM chips or modules. The CMD11A8 controller typically is provided with at least 8 kB of on-board memory. The size of memory 34 may be varied to suit a particular operating environment, the required amount being proportional to the number of sales transactions to be stored between memory dumps to central computer 60 (FIG. 3). Controller 26 must be programmed with the instructions necessary for performing the desired functions of the present invention using a high-level computer language such as BASIC, C++ or FORTH. In alternate embodiments, controller 26 could receive necessary instructions from a PROM, PAL or other similar programmable memory device. Such a memory devices would be "burned" with the necessary instructions using techniques well known in the art.

Real-time clock 36 provides date and time information to controller 26. Such a real-time clock is included as part of the CMD11A8 controller 26. In other embodiments, any clock chip or card well know in the art and located external to controller 26 could be employed. A suitable real time clock is model WNTR1000P manufactured by Industrial Computer Source, Inc.

Modem 38 receives commands and output data from controller 26. These commands are used to initialize modem 38 so that the output data may be transmitted to a remote, central computer 60 (FIG. 3). A typical modem is Model XJ4288 manufactured by Megahertz. The speed of the modem may be chosen to fit the operating circumstances. Typically a 1200 baud or higher transmission rate would be employed. Modem 38 is connected, in turn, to a cellular communication interface 40. A typical cellular communication interface is Model TROEM-1 manufactured by Nokia. In the preferred embodiment, the cellular interface 40 in each of a plurality of vending machines 10 utilizes a single cellular number which is time-shared under the control of controller 26 and real-time clock 36. Each vending machine in the system may be pre-programmed with an assigned time slot during which it may use the cellular communication link without interference from other machines. Time assignments will depend on the number of machines in the system, the time required to transmit the required data and the transmission speed of modem 38. It would be obvious to those skilled in the art that any number of cellular numbers could be employed if the call volume from the vending machines were higher than could be supported using a single number.

An input/output port 42 is provided to controller 26 for use by machine refill/service personnel in updating inventory and/or available change status in memory 34 of vending machine 10. Typically, a hand-help bar code scanner 52 (FIG. 2) such as Model V14-1006 from Zebra Technologies may be connected to input/output port 42. Other input/output devices such as keyboards or keypads could additionally or alternately be connected as individual operating circumstances dictated.

Figure 2:
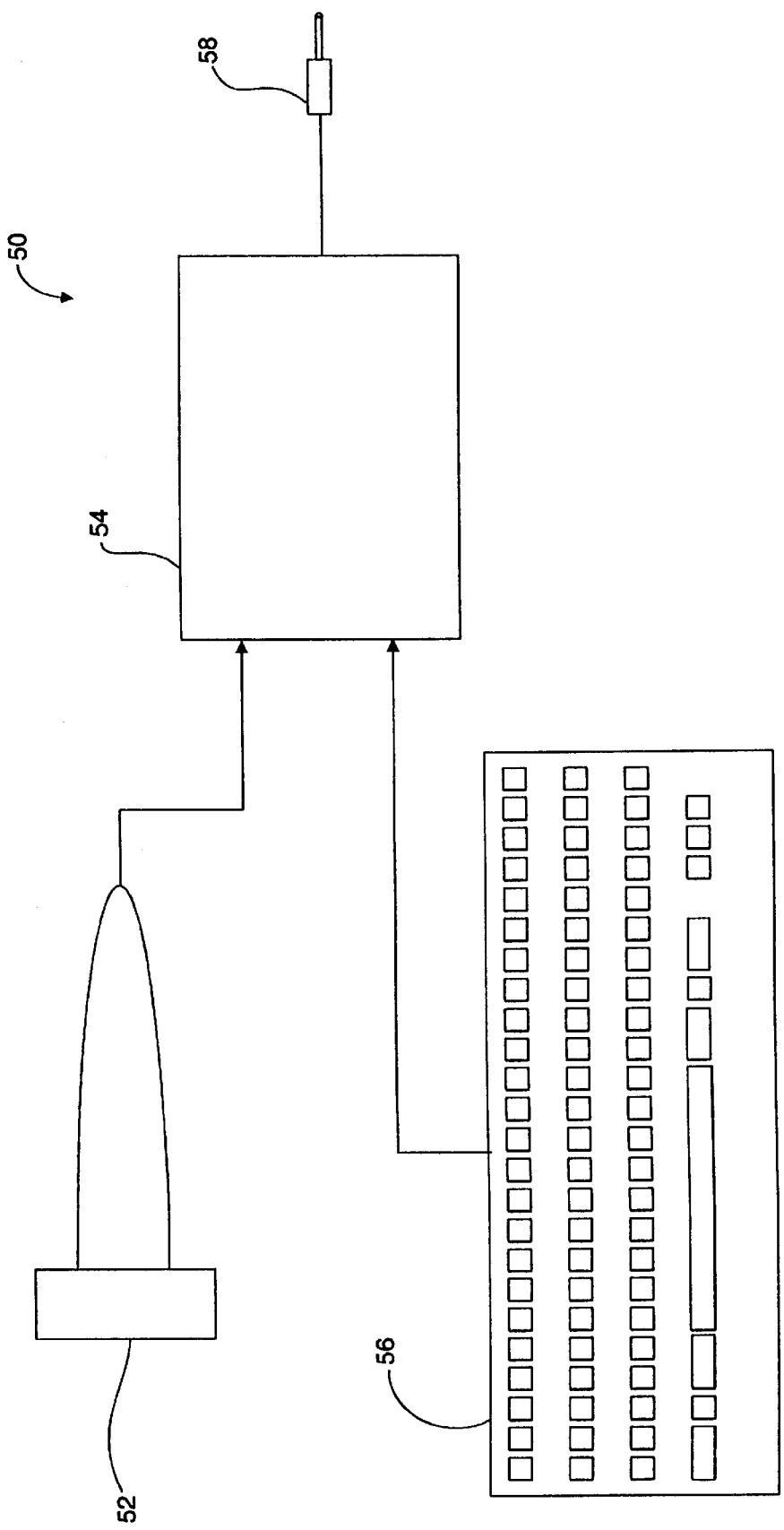
FIG. 2 is a schematic block diagram of an ancillary, portable system used by route restock/service personnel for communicating with the inventory management system.

Referring now to FIG. 2, there is shown generally at reference number 50 a schematic block diagram of the portable system carried by refill/service attendants. Hand-held bar code scanner 52 is shown connected a controller 54. An optional keyboard or keypad 56 is also shown connected to controller 54. The output of controller 54 is provided with a plug 58 matching the connector on input/output port 42 (FIG. 1). In other embodiments, the functions of controller 54 could easily be included within controller 26 (FIG. 1) and bar code reader 52 and/or keyboard 54 could be plugged directly into input/output port 42 of controller 26.

Referring now to FIG. 3, there is shown a block diagram of the overall system of the present invention. A plurality of vending machines 10 are disposed within the communication confines of a cellular communications network represented schematically at reference number 68. Central computer 60 is equipped with a modem 62 connected to a normal telephone line 64. Statistical analysis and communication software (not shown and well known in the art) running within computer 60 receives data from remotely-located vending machines 10 by means of the cellular communication network consisting of cellular communication interface 40 (FIG. 1) within each of the plurality of vending machines 10; air-borne telephone signals 70; and cellular receiving station 72 connected to the telephone landline network. A printer 66 may optionally be attached to computer 60 for providing hard copies of the statistical analysis performed by computer 60. In addition to statistical analysis, specific software running also on computer 60 may be employed to automatically order products based upon projected need within plurality of vending machines 10.

In typical use, a buyer (not shown) inserts bills and/or coins into acceptance unit 28 in an amount greater than or equal to the purchase price shown on tag 20 associated with a desired product 18. Next, the buyer press buttons 14 on selection unit 12 and enters the code located on tag 20 associated with desired product 18. Decoder 24 provides a signal representing the rack 22 holding desired product 18 to processor 26. Acceptance unit 28 provides controller 26 with the amount of money tendered by the buyer. If adequate money has been tendered, controller 26 sends an appropriate dispense command to dispensing unit 16 and the desired product 18 is delivered to the buyer. If change is due, acceptance unit 28 returns the correct change to the buyer.

Processor 26 queries real-time clock 36 and then writes a transaction record to memory 30. Information included in the transaction could include the date and time of the transaction, the code of the product dispensed, and the exact count of bills/coin denominations tended by the buyer.

At a predetermined time, controller 36 activates modem 38 and subsequently cellular telephone interface 40 which initiates a telephone call to a central computer 60 (FIG. 3). Transaction records, status of inventory amount of change remaining and other such information is then uploaded from vending machine 10. Transaction records in memory 34 may then be erased or tagged as transmitted and later erased. The transaction records from each machine, selected groups of machine, and ultimately all machines may be statistically analyzed by computer 60 and summaries distributed to management and/or route service personnel.

Prior to a visit to a vending machine 10, the route service person may have been provided a complete analysis of the machine's performance. He could, therefore, have with him adequate supplies of items which were good sellers and, if required, stock multiple racks 22 (FIG. 1) with an identical product 18 (FIG. 1). The service person would update the inventory in the machine using hand-held bar code scanner. First, the bar code of a particular rack 22 would be scanned. Next, the UPC bar code of each item of merchandise and the bar code of the position with rack 22 would also be scanned. In this manner, memory 34 (FIG. 1) would contain a complete record of each item of merchandise including its location within dispensing unit 16 (FIG. 1). Selling price information could be entered using predefined bar codes or could be key-entered using optional keyboard 56 (FIG. 2). In this manner, individual racks 22 could be stocked with more than one product type and vending machine 10 would automatically charge the correct price. This strategy assumes that labels 20 (FIG. 1) are implemented using an electronic display technology and selling price information may be dynamically changed by controller 26. In a like manner, the route attendant may input the exact amount of change placed in the machine into memory. Finally, the route attendant may manually delete information from memory 34 (FIG. 1) as required.

Since other combinations, modifications and changes varied to fit particular operating requirements and environments will be apparent to those skilled in the art, the invention is not considered limited to the chosen preferred embodiments for purposes of disclosure, but covers all changes and modifications which do not constitute departures from the true spirit and scope of this invention.

Having thus described the invention, what is desired to be protected by Letters Patent is presented in the subsequently appended claims.

What is claimed is:

1. A system for monitoring inventory in a plurality of vending machines, comprising:
   at least one vending machine adapted to selectively dispense from a known preloaded product inventory, at least one product, said at least one product having a unique product identification code and a predetermined selling price, to a buyer upon payment of said predetermined selling price, said payment comprising currency, said vending machine comprising:
   timing means capable of generating data representative of the time and date of least one of said acts of dispensing;
   means operatively connected to said timing means for generating data responsive to at least one of said acts of dispensing, said data comprising said identification code, said predetermined selling price, the denominations of said currency, and said date and said time;
   storage means operatively connected to said timing means and to said generating means for accumulating said generated data, and for holding data representative of said known inventory;
   processing means operatively connected to said storage means and to said generating means for accepting said generated data and updating said data representative of said known inventory;
   communication means for transmitting information comprising said accumulated data and said known inventory in response to said timing means; and
   data input means operatively connected to said processing means whereby an operator may update said known product inventory;
   remote processing means adapted to receive said transmitted data and said known inventory data from each of said at least one vending machines, and selectively combining said received data and generating an output representative said dispensing activities of individual or predetermined groups of said at least one vending machine.

2. The system for monitoring inventory in a plurality of vending machines as recited in claim 1, said at least one vending machine further comprising: at least one uniquely identifiable rack, said at least one uniquely identifiable rack having uniquely identifiable positions associated therewith, each of said uniquely identifiable positions being adapted to hold one unit of said uniquely identified preloaded product.

3. The system for monitoring inventory in a plurality of vending machines as recited in claim 2, wherein said uniquely identifiable rack and said uniquely identifiable positions are each identified by means of bar codes affixed proximate said uniquely identifiable rack and said uniquely identifiable positions thereof, respectively.

4. The system for monitoring inventory in a plurality of vending machines as recited in claim 3, said vending machine further comprising means for storing within said storage means a predetermined selling price associated with each of said uniquely identifiable positions of said uniquely identifiable racks such that preloaded products having different predetermined selling prices may be mixed within said uniquely identifiable positions of said uniquely identified rack, said processing means being adapted to dispense a preloaded product at the predetermined selling price associated with said uniquely identifiable position holding said product.

5. The system for monitoring inventory in a plurality of vending machines as recited in claim 4, wherein said communication means comprises a cellular telephone interface and a modem.

6. The system for monitoring inventory in a plurality of machines as recited in claim 5, wherein said cellular telephone interface in each of said at least one vending machines utilizes the same cellular telephone number.

7. The system for monitoring inventory in a plurality of vending machines as recited in claim 5, said at least one vending machine further comprising a supply of change and said processing means further being adapted to compute an amount of change to be returned to a buyer from said supply of change when said payment exceeds said predetermined selling price.

8. The system for monitoring inventory in a plurality of vending machines as recited in claim 5 wherein said data input means comprises a bar code scanner.

9. The system for monitoring inventory in a plurality of vending machines as recited in claim 5 wherein said data input means for comprises a keyboard.

10. The system for monitoring inventory in a plurality of vending machines as recited in claim 5, wherein said prossing means and said storage means and said timing means comprises a micro-controller.

11. The system for monitoring inventory in a plurality of vending machines as recited in claim 10, wherein each of said at least one vending machines initiates telephone communication at a time determined by said processing means in cooperation with said real-time clock, said predetermined times being arranged such that only one of said at least one vending machines utilizes said cellular communication at any time.

12. A method for monitoring inventory in a plurality of vending machines, the steps comprising:

providing at least one vending machine capable of vending preloaded a product having a unique identification from a known inventory of said product, said product having a predetermined selling price, in response to a request from a buyer and upon tendering currency equal to or greater than said predetermined selling price, said vending machine having the capability to identify the denominations of all said tendered currency and for creating data representative thereof, further said vending machine having the capability to create data representative of said unique product identification, the date, and the time of any vending event, said vending machine having the capability to accumulate all such data and, at a predetermined time, to transmit said data to a remote computer via a cellular telephone communication link;

initiating a vending event by a buyer, said buyer tendering currency equal to or greater than said predetermined selling price;

returning change to said buyer when said tendered currency exceeds said predetermined selling price; updating said known inventory in response to said vending event;

creating a data record of said vending event, said data record comprising said unique product identification code, said denominations of said tendered currency, said date and said time of said vending event;

storing a plurality of said data records;

transmitting said plurality of data records to a central computer via a cellular telephone communication link;

processing said plurality of data records at said central computer to produce an output representative of the vending history of said at least one vending machine;

restocking said at least one vending machine with said products responsive to said output representing said vending history so as to minimize the possibility of an out-of-stock condition; and updating said known inventory in said vending machine to reflect said restocking.

* * * * *